United States Patent

Harnden, Jr.

[15] 3,671,749

[45] June 20, 1972

[54] SIMULTANEOUS LIGHT TRIGGERING OF THYRISTOR ARRAYS

[72] Inventor: John D. Harnden, Jr., Schenectady, N.Y.

[73] Assignee: General Electric Company

[22] Filed: Feb. 17, 1971

[21] Appl. No.: 116,152

[52] U.S. Cl. ..........................250/208, 250/211 J, 250/217, 307/311

[51] Int. Cl. ..........................H01j 39/12

[58] Field of Search..............250/211 J, 213 A, 217 SS, 208, 250/209; 307/311, 296, 314; 321/60; 340/171; 343/225; 328/258; 241/172

[56] References Cited

UNITED STATES PATENTS

| | | | |
|---|---|---|---|
| 2,866,909 | 12/1958 | Trousdale | 307/257 |
| 3,041,475 | 6/1962 | Fisher, Jr. | 307/257 |
| 3,355,600 | 11/1967 | Mapham | 241/172 |
| 3,386,027 | 5/1968 | Kilgore et al. | 321/11 |
| 3,524,986 | 8/1970 | Harnden, Jr. | 250/211 J |

*Primary Examiner*—Donald D. Forrer
*Assistant Examiner*—R. E. Hart
*Attorney*—Paul A. Frank, John F. Ahern, Frank L. Neuhauser, Oscar B. Waddell and Joseph B. Forman

[57] ABSTRACT

Series and parallel thyristor arrays are switched synchronously with respect to their own anode in high voltage a-c and d-c circuits using light activated gating circuitry controlled by a common light emitting diode for simultaneous triggering. Each individual gating circuit includes a light sensor device and an almost continuously available source of gating energy obtained from its own isolated power supply in the form of a tuned high frequency resonant circuit. The toroidal coils in each resonant circuit are coupled together and to a power coil. Non-magnetic unit gating circuit power supplies are also described.

11 Claims, 5 Drawing Figures

Inventor
John D. Harnden, Jr.
by Donald R. Campbell
His Attorney

Inventor
John D. Harnden, Jr.
by Donald R. Campbell
His Attorney

Inventor:
John D. Harnden, Jr.
by Donald R. Campbell
His Attorney

SIMULTANEOUS LIGHT TRIGGERING OF THYRISTOR ARRAYS

BACKGROUND OF THE INVENTION

This invention relates to the simultaneous triggering of series and parallel thyristor arrays, and more particularly to light gated thyristor arrays that are capable of being switched synchronously with respect to their own anode voltage in a-c and d-c circuits.

A plurality of series-connected or parallel-connected thyristors are used when the maximum circuit operating voltage or current is higher than the rating of a single device. Series thyristor strings are commonly employed for example in high voltage unidirectional and alternating current circuits. With the thyristors non-conducting, the high voltage is shared equally among the series-connected devices so that the voltage blocked by any one device is well within its voltage blocking capability. A problem associated with series strings, however, is the necessity for simultaneous turn-on of all of the thyristors. In the event of staggered triggering, the voltage across the conducting thyristors quickly collapses and the entire circuit voltage is applied across the untriggered device or devices. Similarly, parallel-connected thyristors share the total circuit current, and simultaneous turn-on is required to prevent the passage of an overcurrent through one device in the interval before the others conduct.

An effective simultaneous triggering technique for series and parallel thyristor arrays involves the use of a light activated semiconductor switching device in the gating circuit of each power thyristor and a common light emitting source. One such light controlled circuit is shown by U.S. Pat. No. 3,355,600, granted Nov. 28, 1967 to Neville W. Mapham, and assigned to the General Electric Company. However, many circuits of this type are not suitable for synchronous switching of the power thyristors, i.e., switching at the zero voltage crossing points of an alternating current supply. This is because the light activated semiconductor devices in the gating circuits are connected such that they have no voltage when the power circuit voltage passes through zero. A similar problem occurs in inverter circuits with a regenerative or reactive load, when it is necessary to render conductive the thyristor arrays synchronous with the change in polarity of the anode voltage.

SUMMARY OF THE INVENTION

A series or parallel array of solid-state switches, preferably gate-controlled power thyristors, are connected between a pair of supply terminals in which appears an alternating or unidirectional electric potential. The invention is especially suitable for high voltage single phase and polyphase circuits and for high voltage d-c power circuits connected in inverter mode. Light controlled gating circuit means for substantially simultaneously triggering all of the solid-state switches to conduct current is characterized by an individual gating circuit for each solid-state switch that includes a light activated semiconductor device and an almost continuously available source of gating signal energy powered from an individual power supply. The several individual power supplies are non-galvanically and non-electrostatically coupled and in the principal embodiment are energized by a power coil driven at a preselected high frequency. A common light emitting diode emits light pulses that are optically coupled to each light activated semiconductor device to render these devices conductive simultaneously and thereby generate a gating signal in each individual gating circuit.

The isolated, individual gating circuit power supplies are more particularly resonant circuits including an inductive component such as a toroid and a capacitive component tuned to the preselected frequency. The toroids of the several gating circuits are magnetically coupled to one another and to the power coil, also a toroid, and an output coil and other rectifier components generate a voltage for continuously charging a capacitor to provide gating signal energy. Consequently, synchronous switching operation in a-c circuits is made possible with virtually zero power circuit voltage as well as conventional operation when power circuit voltage is available. Also, inverter circuits operating from a d-c supply and supplying a regenerative or reactive load can be switched synchronous with the passage of the anode voltage through zero. In another embodiment, the individual gating circuits use a solar cell source of gating energy.

DESCRIPTION OF THE PREFERRED EMBODIMENTS

Figure 1:
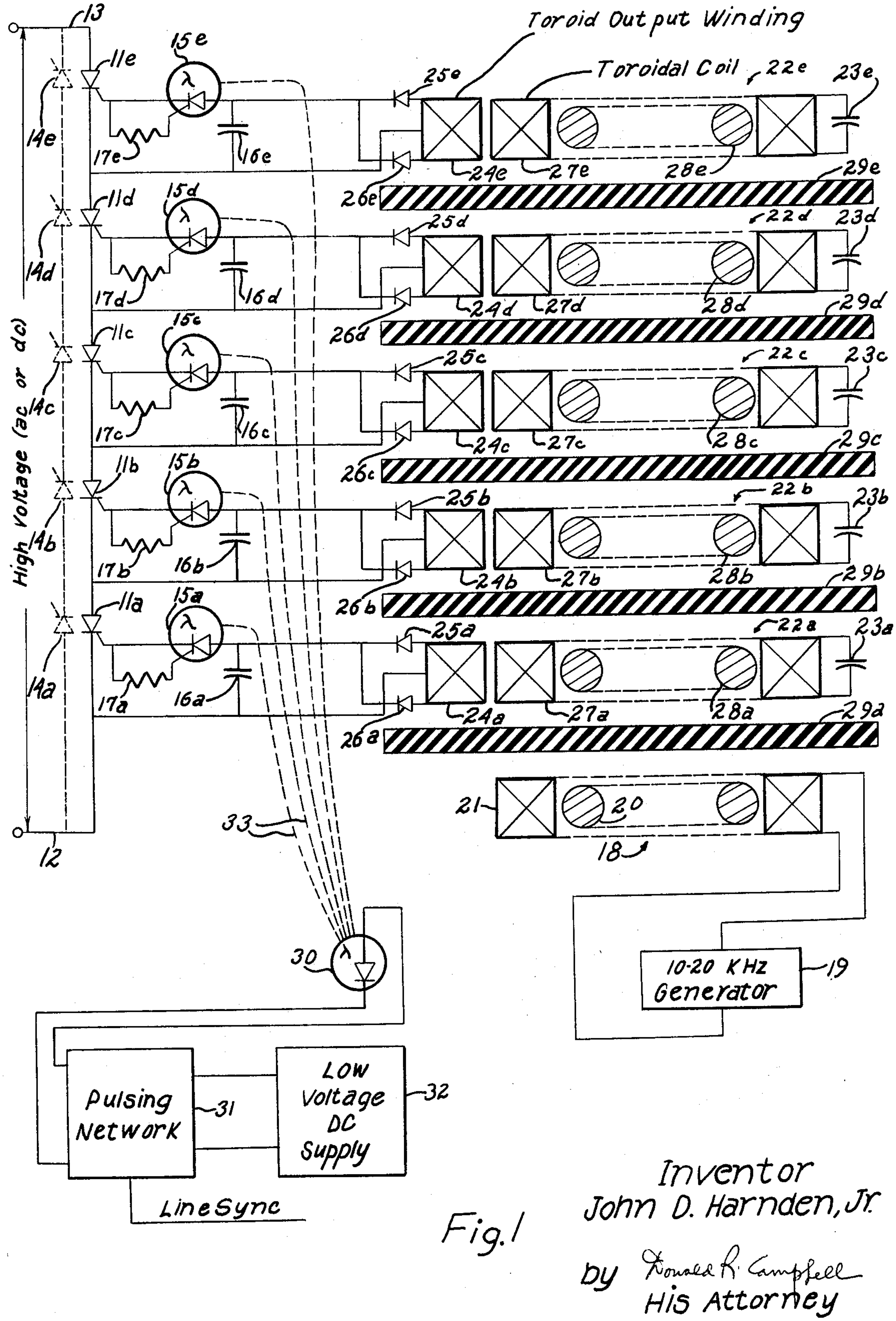
FIG. 1 is a schematic circuit diagram of a high voltage a-c or d-c circuit with several series-connected power thyristors and light activated gating circuits therefor that are controlled by a common light emitting semiconductor diode and constructed according to the invention with individual, isolated low voltage power supplies.

Referring to FIG. 1, a series string of power thyristors 11*a*–11 (reading from bottom to top) is connected between a pair of power supply terminals 12 and 13 that in turn are adapted to be connected across a high voltage alternating current or direct current source. Power thyristors 11*a*–11*e* are preferably unidirectional conducting thyristors, commonly known as silicon controlled rectifiers, but can be other suitable power solid-state switching devices such as the triac or the transistor. The invention is directed to light controlled, isolated gating circuitry for the simultaneous triggering of all five series-connected power thyristors to switch them substantially as a unit from the non-conducting to the conducting state. For use with a high voltage direct current source only a single series string is required. For high voltage single phase or polyphase alternating current sources, however, or for inverter circuits operating from a direct current supply, additional series strings of power thyristors are usually needed, each string being controlled by identical but indendently operating light activated gating circuitry. A common arrangement for a-c circuits shown in dashed lines in FIG. 1 is a second series string of unidirectional conducting power thyristors 14*a*–14*e* connected in inverse-parallel relationship with the first string between power terminals 12 and 13. Other possible connections of series strings are taught in the SCR Manual, 4th Edition, published by the General Electric Company, Electronics Park, Syracuse, New York, copyright 1967. Some of the light controlled power circuits disclosed in the inventors' U.S. Pat. No. 3,524,986, granted Aug. 18, 1970, are also suitable for use with series strings. The basic component in all these circuit arrangements, to be described in this application, is the single series string shown in full lines in FIG. 1.

The structure and operation of power thyristors 11*a*–11*e* is well known. Briefly, the silicon controlled rectifier is a unidirectional conducting four-layer power semiconductor with a gate electrode. Assuming that the anode is positive with respect to the cathode, the application of a short duration gate current pulse to the gate electrode causes the device to switch from its high impedance blocking condition to the low impedance conducting condition. Thereafter the gate electrode loses control over conduction through the device, and to turn it off or render it non-conductive it is necessary to reduce the current through the device below the holding value and make the cathode negative with respect to the anode. Although special commutation circuits are frequently provided to implement turntoff of the device, it can also be line commutated by the passage of the a-c source voltage through the voltage zero. This is the normal mode of operation of the device. However, the device can also be switched to a conducting on-state by the application across the device of an anode-to-cathode voltage that exceeds the forward blocking voltage rating. Thus, as previously mentioned, it is customary to connect a plurality of thyristors in series when the maximum circuit operating voltages are higher than the forward blocking voltage of a single device. With all of the series-connected thyristors in the blocking condition, the circuit voltage is then shared approximately equally by the several devices. For this purpose, voltage sharing components not shown in FIG. 1 are commonly used, such as equal resistors connected across each device to form a resistive voltage divider, or the series combination of a resistor and a capacitor connected across each device. By sharing the circuit voltage, the voltage applied across each device is less than its forward blocking voltage. Such voltage sharing components also assist in distributing relatively high frequency voltage components between the devices during the period before turn-on. Another thyristor voltage rating of interest is the peak forward voltage, which is the maximum instantaneous forward voltage permitted before damage to the thyristor occurs. The peak forward voltage, of course, is usually higher than the forward blocking voltage.

Simultaneous triggering of all the thyristors in a series array by the usual mechanism of applying gate pulses to their gate electrodes is required in order to prevent damage to the devices by exceeding the peak forward voltage. If one or more thyristors are fired before the others, the voltage across the conducting devices quickly collapses and the entire circuit voltage is then applied across the unfired thyristors. Resistor or resistor-capacitor voltage sharing components are ineffective to prevent damage to the unfired devices if the portion of the circuit voltage appearing across each unfired device exceeds its voltage rating. Simultaneous triggering of a thyristor array is facilitated by the application of gating current signals with a steep rise time to lessen the effect of variations in gate characteristics. Also, good dynamic device properties require high current pulses with a steep rise time. An effective, low cost technique for applying such gating current signals is the use of light activating gating circuits controlled by the light emitted by a single light emitting semiconductor diode, a junction laser, or a Xenon flash lamp. These light sources emit pulses of light with steep rates of rise of luminous intensity. It is realized of course that the solid state devices can also emit continuously. For these reasons, the gating circuit for the thyristor array shown in FIG. 1 retains light triggering, but introduces the desirable feature of continuously or almost continuously energizing each individual gating circuit by a separate, isolated source of power so that the array can be triggered when the anode voltage in the power circuit is virtually zero as well as when the anode voltage has a defined positive value.

Accordingly, the gating circuit of power thyristor **11*a* in FIG. 1 includes a suitable light activated semiconductor switching device 15*a* connected in series with a low voltage power supply capacitor 16*a* between the gate electrode and cathode of the power thyristor. Light activated semiconductor device 15*a* is preferably a light activated silicon controlled rectifier (LASCR) or a light activated silicon controlled switch (LASCS). Another suitable photodetector is a light sensitive composite device with a fast rise time using an equivalent circuit with several transistors and diodes, such as the device described in Technical Bulletin LCS-9-69 published by Electronic Micro Systems, Santa Ana, California. The light activated silicon controlled rectifier is similar to the ordinary silicon controlled rectifier just described with the exception that a transparent window is provided to permit triggering by means of radiant energy incident on the silicon as well as by the application of a normal gate signal to its control gate electrode. For this application, the gate electrode of LASCR 15*a* is permanently connected to its cathode through a bias resistor 17. The incidence of light energy within the visible and invisible optical spectrum to which the device is responsive acts to create hole-electron pairs that generate current flow sufficient to turn on the device assuming that the anode is positive with respect to the cathode. Power supply capacitor 16*a* is continuously charged with a polarity to provide the proper biasing conditions for the anode-to-cathode circuit of light activated semiconductor device 15*a*, and is a continuously available source of gating energy except for the short discharge and charge times. Similarly the other series-connected power thyristors 11*d*–11*e* have individual, isolated light activated gating circuits that are continuously energized. Each of these gating circuits includes the series combination of one of the respective light activated semiconductor devices 15*b*–15 and the associated power supply capacitor 16*b*–16*e***.

Figure 2:
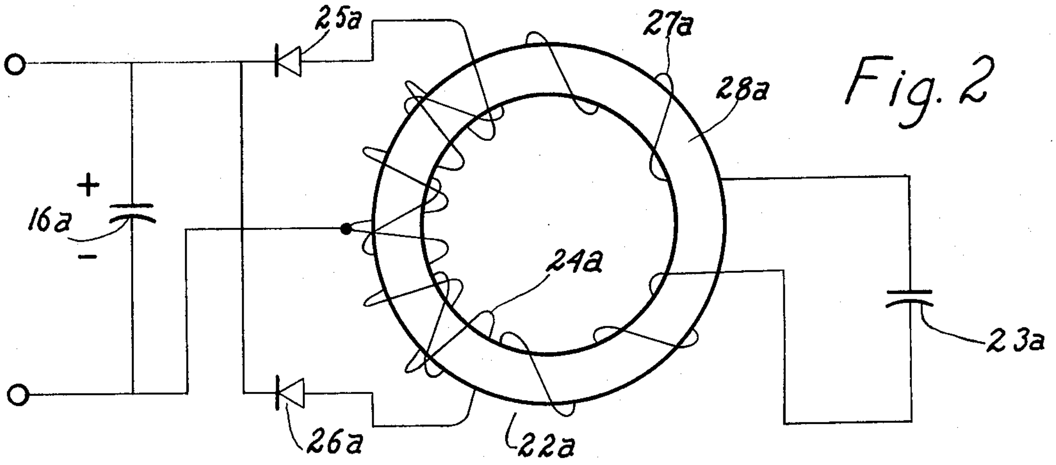
FIG. 2 is a schematic diagram of the power supply circuitry of a single gating circuit including a plan view of the toroidal coil illustrated diagrammatically in cross section in FIG. 1.

The power supply for continuously energizing gating circuit capacitors **16*a*–16*e* includes a plurality of magnetically coupled tuned circuits, one for each gating circuit. Power for these magnetically coupled tuned circuits is provided by a high frequency toroidal coil 18 driven by a suitable generator 19 preferably having a frequency in the range of 10–20 kHz. The magnetic core 20 about which coil 21 is wound to form toroidal coil 18 may be made of a special high frequency magnetic material. Sendust rings made of high frequency powdered iron material with some aluminum are appropriate for this application. The gating circuit for power thyristor 11*a* includes a similar toroidal coil 22*a* located in physical proximity so as to be within the high frequency magnetic field produced by power toroidal coil 18. Coil 22*a* is connected in parallel circuit relationship with a high frequency capacitor 23*a* to form a parallel resonant circuit which is tuned to resonance at the frequency produced by generator 19. An output coil 24*a* associated with coil 22*a* is used to produce a direct current voltage for energizing capacitor 16*a*. For this purpose, coil 24*a* and a pair of diodes 25*a* and 26*a* are connected to form a center-tapped diode rectifier whose output terminals are connected across capacitor 16*a*. To clarify the arrangement, a plan view of toroidal coil 22*a* is given in FIG. 2. Main coil 27*a* and output coil 24*a* are both wound about magnetic core 28*a***, which may also be a sendust ring.

The gating circuits for the other series-connected power thyristors **11*b*–11*e* have identical isolated, magnetically coupled power supplies for supplying a d-c voltage to continuously energize the respective gating circuit capacitors 16*b*–16*e* Each of these isolated power supplies includes a toroidal coil and associated high frequency capacitor tuned to resonance at the frequency of generator 19, and a center-tapped output coil connected to a diode rectifier. All five toroidal coils 22*a*–22*e* and also power toroidal coil 18 are stacked one upon the other separated by sheets of insulation 29*a*–29*e*. There is thus no galvanic or electrostatic coupling between the gating circuits, only the magnetic coupling between adjacent toroidal coils. Energization of the power toroidal coil by generator 19 causes the high frequency magnetic field to be coupled with toroidal coil 22*a*, which resonants with high frequency capacitor 23*a*. The high frequency magnetic field associated with this tuned circuit is in turn coupled to toroidal coil 22*b* which resonants with capacitor 23*b*, and so on. The power requirements of the high frequency portions of the gating circuits are small enough that these portions of the circuits are kept energized much as would be the other control circuit components from a standby battery. Thus, gating circuit capacitors 16*a*–16*e*** are maintained in a charged condition, and the energy is available for triggering the power thyristors at any time the anode voltage is present. The discharge and charge times of each capacitor are usually shorter than the shortest possible turn-on and turn-off times of the corresponding power thyristor.

Simultaneous light triggering of light activated semiconductor devices **15*a*–15*e* is provided by a single light emitting source 30**, preferably a light emitting semiconductor diode. A light emitting semiconductor diode converts electricity directly into light by a process known as junction injection electroluminescence. These devices are frequently made of gallium phosphide, gallium arsenide, or combination of these two semiconductors, and are more particularly p-n junction diodes that emit light when biased in the forward direction. Good light emission produced when the device is stimulated by a direct current electrical signal occurs in different regions of the infrared and visible spectrum according to the material of which the particular device is fabricated. The basic types of devices produce coherent or non-coherent light, while some are operable at room temperatures and others operate only at cryogenic temperatures. The light emitting diode of primary interest in this application is a low cost diode that operates at room temperature.

The design characteristic of light emitting diode 30 of interest is that it emits a sharp, steeply rising pulse of light to assure simultaneous turn-on of light activated semiconductor switching devices **15*a*–15*e* in the gating circuits when so commanded by the control circuit. Light activated semiconductor devices 15*a*–15*e*, of course, must be selected to be responsive to the spectral frequency emitted by light emitting diode 30. Diode 30 is energized by an appropriate pulsing network 31 powered from a low voltage d-c supply 32. For synchronous switching operation of the thyristor array, line synchronization of pulsing network 31 is required in order to obtain switching at the zero voltage crossing points. Light pipes 33 are ordinarily provided to assure that the light emitted by diode 30 impinges on the light sensitive surface of light activated semiconductor devices 15*a*–15*e***. The light pipes preferably comprise a bundle of fiber optic elements formed from glass or plastic fibers with suitably chosen light transmission properties. These can be the focusing or non-focusing type.

By way of brief review of the operation of the FIG. 1 series array embodiment of the invention, the five series-connected power thyristors **11*a*–11*e* have individual, isolated, light controlled gating circuits characterized by an almost continuously available source of gating energy in the form of one of the respective charged, low voltage capacitors 16*a*–16*e*. These gating circuit capacitors are individually charged by the d-c voltage produced by isolated, magnetically coupled power supplies energized by high frequency toroidal coil 18 and generator 19. The high frequency alternating magnetic field produced by toroidal coil 18 is magnetically coupled to toroidal 22*a*, and successively to the other toroidal coils 22*b*–22. Each of the toroidal coils 22*a*–22*e* resonants at the generator frequency with its respective high frequency capacitor 23*a*–23*e*. Output coils 24*a*–24*e* and the associated center-tapped diode rectifiers produce individually the d-c voltages for charging the respective gating circuit capacitors 16*a*–16*e*. Simultaneous triggering of all the power thyristors 11*a*–11*e* within the series array is obtained at the desired interval by pulsing light emitting semiconductor diode 30 from pulsing network 31. The emitted light is transmitted through light pipes 33 and impinges on the light sensitive surfaces of light activated semiconductor devices 15*a*–15*e*, rendering them conductive substantially simultaneously. Each gating circuit conducts a capacitor discharge gating current pulse characterized by a steep rise time, thereby obtaining "hard gating" and assuring simultaneous triggering of all the power thyristors. Light activated thyristors 15*a*–15*e*** are commutated off when the current in the gating circuit falls below the holding current.

The use of gating circuit capacitors **16*a*–16*e* is not essential to the operation of the circuit when appropriate modifications are made, not here illustrated. This involves replacing the half-wave rectifiers comprising output coils 24*a*, etc., and the two associated diodes by a full wave rectifier. The output coil in this case need not be center-tapped. Commutation of light activated thyristors 15*a*–15*e* in the modified circuit without a capacitor then occurs at the end of a succeeding half wave when the output voltage of the full wave rectifier falls to zero. With a gating circuit power supply frequency much greater than the power circuit frequency there is again an almost continuously available source of gating signal energy. Generator 19** has a larger power rating in order that there be sufficient gating current.

The new circuit is a low cost, economical solution to the problem of high voltage series string operation of thyristors and other solid-state switches. One feature of the circuit is that the light sensors **15*a*–15*e* are protected from transient voltage disturbances appearing in the main power circuit. This is because each light receiver is powered by its own individual isolated low voltage power supply. Another feature is that each gating circuit need only be insulated for the portion of the total power circuit voltage appearing across its respective power device 11*a*–11*e***. Since there is no path between the units there is no problem in making each gating circuit low cost with low cost insulation.

Figure 3:
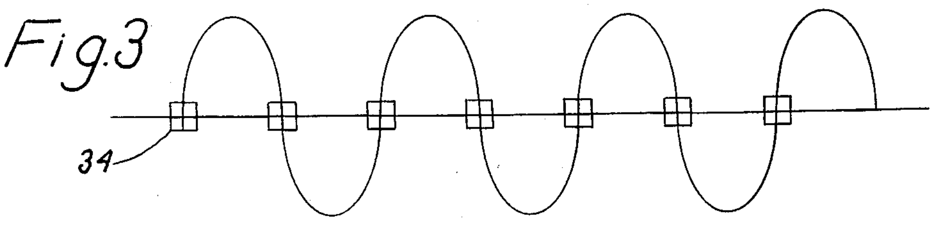
FIG. 3 is a voltage sine waveform useful in explaining the principles of synchronous switching.

The outstanding advantage of this circuit when used with alternating current sources, however, is that it is possible to trigger the power thyristors when the anode voltage is virtually zero in the synchronous switching mode of operation. Referring to the voltage sine wave in FIG. 3, the series string of power thyristors conducts for an integral number of half cycles and is turned on within a few volts of the zero crossing point as defined by the limits of box 34. The series thyristors are commutated at the end of a complete half cycle by the line commutation mechanism previously described. Power thyristor string **11*a*–11*e* conducts on the positive half cycle of the supply voltage whereas the inverse-parallel thyristor string 14*a*–14 conducts the power current on the negative half cycle of the supply voltage. Thyristors 14*a*–14*e* are controlled by a similar light activated gating circuit controlled by light emitting semiconductor diode 30** or by another light emitting diode. Zero voltage switching reduces RFI problems and can be used in either single phase or polyphase alternating current circuits. A typical use is a temperature control application. In one method of operation, the current flows in continuous sine wave fashion, until the temperature reaches a selected point to turn off the switch, while in another method a period is established and the series strings conduct for a given number of half cycles within each period. Further information on zero voltage switching is given in U.S. Pat. No. 3,381,226 granted Apr. 30, 1968 to C.M. Jones and J.D. Harnden, Jr., and assigned to the General Electric Company. In addition to synchronous switching applications, the new circuit is useful in phase control applications since the thyristor array can be triggered at any selected phase of the alternating voltage assuming that there is the required condition of positive anode and voltage.

As has been mentioned, the new gating arrangement is useful in high voltage d-c circuits also. The feature of switching synchronously as the polarity of the anode voltage changes has application to series strings in inverter circuits for d-c to a-c conversion. An inverter with a pair of alternately conducting strings of thyristors connected in series circuit relationship across a d-c supply is shown for example in FIG. 3 of U.S. Pat. No. 3,355,600. In an inverter with a regenerative or reactive load, reversal of the load current is not coincident with the turning off of one of the series strings due to the need to first discharge the load. The exact point at which the polarity of the anode voltage of the other series string changes depends on the load power factor. In this application it is desirable to employ carrier gating, i.e., to pulse light emitting diode 30 at a high frequency rate, so that gating circuit light activated devices **15*a*–15*e* conduct and generate a gating signal at the time the load current reverses and the anode voltage of power thyristors 11*a*–11*e*** becomes positive. Although inverter action under these load conditions is well known, the reader is referred to U.S. Pat. No. 3,568,021 for further information if needed.

Figure 4:
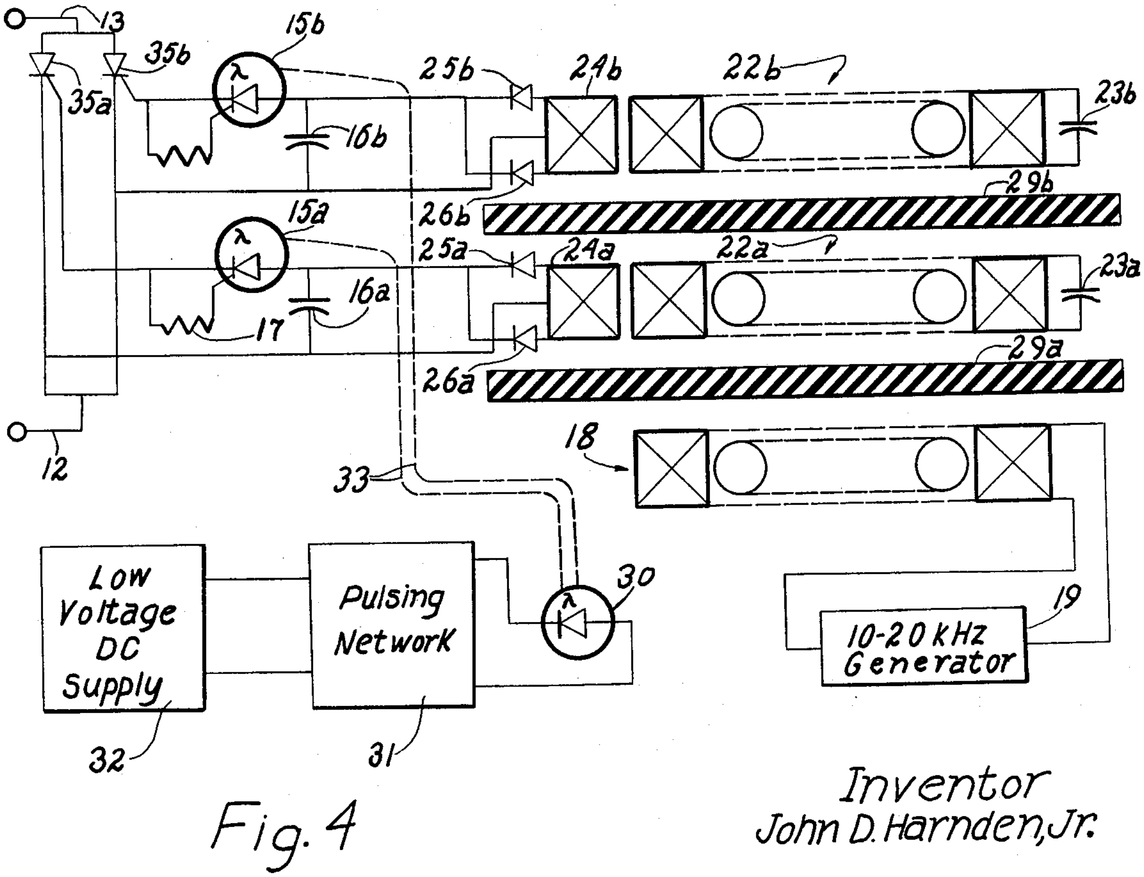
FIG. 4 is a schematic circuit diagram of another form of the invention with parallel-connected power thyristors and the light activated gating circuits of FIG. 1.

FIG. 4 illustrates a second embodiment of the invention for parallel thyristor arrays. Simultaneous triggering is required in this circumstance to obtain proper current sharing among the several parallel-connected power thyristors. If the thyristors or other solid-state switches are rendered conductive in staggered fashion, the overcurrent may damage a conducting device in the interval before the other devices are triggered. In FIG. 4, power thyristors 35a and 35b are connected in parallel circuit relationship in an alternating current or direct current power circuit between supply terminals 12 and 13. Load sharing components conventionally employed to assure equal division of the current are not illustrated here. The individual, isolated, light-controlled gating circuits for power thyristors 35a and 35b are identical to the gating circuits for series connected power thyristors 11a and 11b in FIG. 1, and the corresponding components are identified by the same numerals. The operation of the circuit is identical to that of FIG. 1, in that high frequency generator 19 operates continuously to energize power toroidal coil 18, and power is transmitted from one gating circuit to the next by the magnetically coupled toroidal coils 22a and 22b. As before, an individual source of low voltage, direct current is available in each gating circuit to continuously energize the respective gating circuit capacitors 16a and 16b. Upon pulsing light emitting diode 30 at the selected time, the light transmitted from the source by light pipes 33 causes light activated semiconductor devices 15a and 15b to be rendered conductive substantially simultaneously. Therefore, gating current pulses are applied individually to power thyristors 35a and 35b, turning on both devices approximately at the same time. The advantages of the new circuit in series string operation applies also to parallel arrays, including the feature of simultaneous triggering when the anode voltage is virtually zero or has some positive value.

Figure 5:
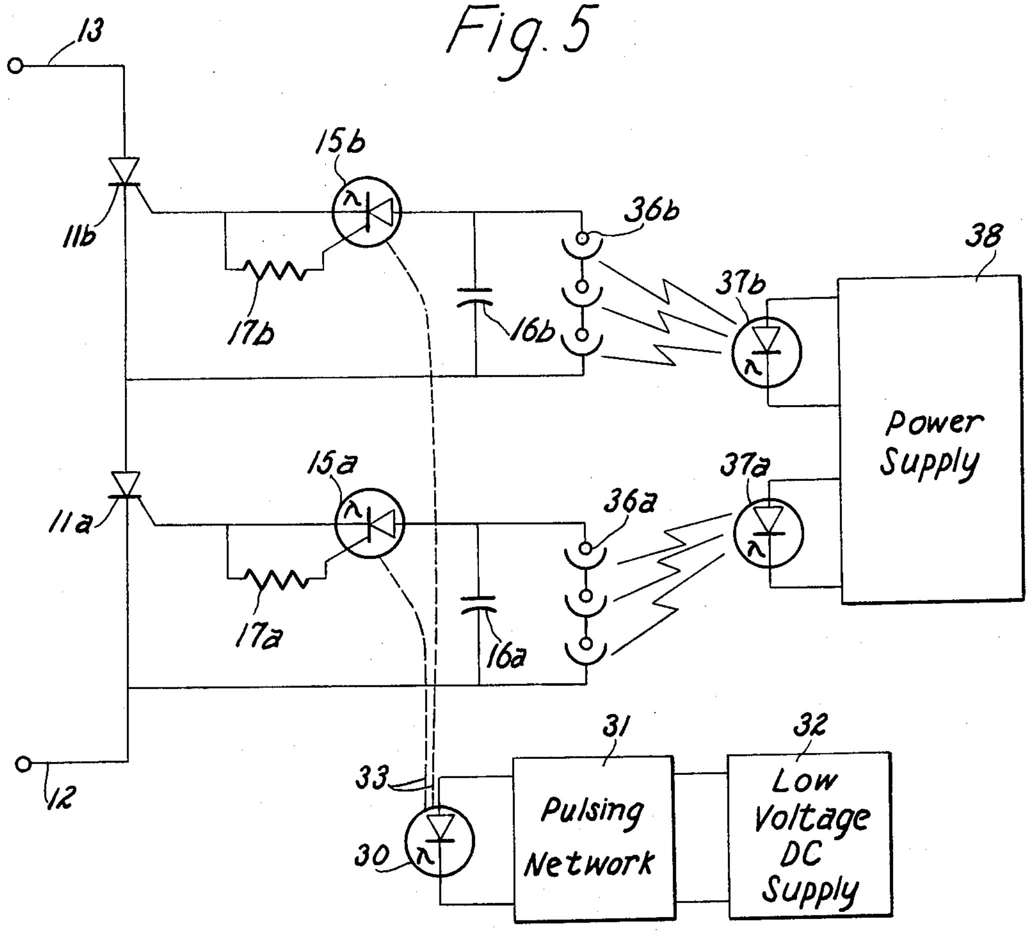
FIG. 5 is a schematic circuit diagram of a different embodiment of the invention in which solar cells are used as the energy source in each individual gating circuit.

A different embodiment of the invention uses an optically energized power supply for the unit gating circuits in place of the magnetic arrangement previously described. The series string power circuit illustrated in FIG. 5 is similar to FIG. 1 and corresponding components are indicated by the same numerals. It is applicable to parallel arrays also. In FIG. 5, a plurality of series-connected solar cells 36a are connected across capacitor 16a. Solar cells 36a are energized by the light emanating from one or more additional light emitting diodes 37a operated by a suitable power supply 38 in either the continuous or pulsed mode. Other solar cell arrays 36b in the other unit gating circuit shown are energized by diode 37b. Each solar cell array serves as a voltage source for charging its respective capacitor 16a and 16b, which in the same manner as in FIG. 1 provides a source of gating signal energy that is available when light activated devices 15a and 15b are rendered conductive by light emitting diode 30.

In summary, the range of utility of series and parallel solid-state switch arrays using light triggering is extended to include switching that is synchronous with its own anode voltage in both a-c and d-c power circuits. For this purpose, each individual gating circuit has a light sensor and a continuously or almost continuously available source of gating signal energy obtained from its own isolated power supply. Both magnetic and non-magnetic individual power supplies have been described. The simultaneously triggered arrays are useful in a variety of d-c, single phase, and polyphase circuits.

While the invention has been particularly shown and described with reference to several preferred embodiments thereof, it will be understood by those skilled in the art that various changes in form and details may be made therein without departing from the spirit and scope of the invention.

What I claim as new and desire to secure by Letters Patent of the United States is:

1. An array of solid-state switches connected between a pair of terminals in which appears an electric potential, and light controlled gating circuit means for substantially simultaneously triggering all of said solid-state switches from the non-conducting to the conducting state characterized by an individual gating circuit coupled to each solid-state switch including a light activated semiconductor device and a continuously available source of gating signal energy deriving power from an individual power supply, wherein each gating circuit power supply comprises a resonant circuit including an inductive component and a capacitive component tuned to a preselected high frequency, said inductive components being magnetically coupled to one another and to a power coil driven at the preselected frequency, and a single light source emitting light that is optically coupled to each light activated semiconductor device to render conductive said light activated devices simultaneously and thereby generate a gating signal in each individual gating circuit.

2. A circuit according to claim 1 wherein said solid-state switches are connected in series circuit relationship between said terminals.

3. A circuit according to claim 1 wherein said solid-state switches are connected in parallel circuit relationship between said terminals.

4. A circuit according to claim 1 wherein said source of gating signal energy in each individual gating circuit is a charged capacitor effectively coupled in series with its respective light activated semiconductor device.

5. A circuit according to claim 4 wherein each individual gating circuit power supply includes a rectifier coupled to its respective resonant circuit for supplying a unidirectional voltage to charge its respective capacitor.

6. A circuit according to claim 5 wherein said inductive component in each individual gating circuit power supply and said power coil are all toroids with magnetic cores, said toroids being stacked flat one upon the other separated by insulation.

7. A circuit according to claim 6 wherein each rectifier includes an output coil wound on its respective power supply toroid.

8. An array of gate controlled power thyristors connected between a pair of supply terminals in which appears an electric potential, and light controlled gating circuit means for substantially simultaneously triggering all of said power thyristors from the non-conducting to the conducting state characterized by an individual gating circuit coupled between the gate and one load terminal of each power thyristor including a light activated semiconductor device and a source of gating signal energy that derives power from an individual low voltage power supply and is in an energized condition as the voltage at said load terminal passes through zero, said individual gating circuit power supplies being magnetically coupled and in turn powered by a high frequency coil driven at a preselected frequency, and a common light emitting diode for emitting a light pulse that is optically coupled to each light activated semiconductor device to render conductive said light activated devices simultaneously and thereby generate a gating signal in each individual gating circuit.

9. A circuit according to claim 8 wherein each individual gating circuit power supply comprises a parallel resonant circuit including an inductive coil and a high frequency capacitor turned to the preselected frequency, and said gating circuit inductive coil and said power coil are magnetically coupled together.

10. A circuit according to claim 9 wherein said source of gating signal energy in each individual gating circuit is a charged capacitor, and each gating circuit power supply further includes an output coil coupled to its respective resonant circuit coil and other rectifier components for deriving a unidirectional voltage to charge its respective charged capacitor.

11. A circuit according to claim 10 wherein said power thyristors are connected in series circuit relationship between said supply terminals.

* * * * *